United States Patent
Andersen et al.

(10) Patent No.: US 12,404,840 B2
(45) Date of Patent: Sep. 2, 2025

(54) INFLATABLE COMPONENT FOR SERVICE OR INSTALLATION OF A WIND TURBINE MODULE

(71) Applicant: Siemens Gamesa Renewable Energy A/S, Brande (DK)

(72) Inventors: Erik Dahl Andersen, Vildbjerg (DK); Thomas Justmi Gade Soerensen, Aalborg (DK); Carsten Keller Hansen, Herning (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/075,306

(22) Filed: Dec. 5, 2022

(65) Prior Publication Data

US 2023/0109464 A1  Apr. 6, 2023

Related U.S. Application Data

(63) Continuation-in-part of application No. 17/253,890, filed as application No. PCT/EP2019/066741 on Jun. 25, 2019, now abandoned.

(30) Foreign Application Priority Data

Jun. 25, 2018  (EP) ..................... 18179612

(51) Int. Cl.
  *F03D 80/50*   (2016.01)
  *F03D 1/06*    (2006.01)
  *F03D 13/10*   (2016.01)

(52) U.S. Cl.
  CPC ............ *F03D 80/50* (2016.05); *F03D 1/065* (2013.01); *F03D 13/10* (2016.05); *F05B 2230/80* (2013.01)

(58) Field of Classification Search
  None
  See application file for complete search history.

(56) References Cited

U.S. PATENT DOCUMENTS

| 2011/0225796 | A1 | 9/2011 | Okutan |
| 2013/0164144 | A1 | 6/2013 | Bendel |

(Continued)

FOREIGN PATENT DOCUMENTS

| CN | 103597204 A | 2/2014 |
| DE | 3933865 A1 | 4/1991 |

(Continued)

OTHER PUBLICATIONS

Volkert et al.—DE 3933865 A1 + machine translation (Year: 1991).*

(Continued)

*Primary Examiner* — Juan G Flores
(74) *Attorney, Agent, or Firm* — Schmeiser, Olsen & Watts LLP (57) ABSTRACT

A wind turbine arrangement, that includes: a wind turbine blade; an inflatable platform positioned in the wind turbine blade; and an inflatable outer pressure ring surrounding the platform, wherein the outer pressure ring, when inflated with a gaseous fluid, fixes the platform in the wind turbine blade by generating a normal friction force between the platform and the wind turbine blade. In a first wind turbine arrangement, after the platform has been inflated with a gaseous fluid, the inflated platform includes a material that contains the gaseous fluid and is continuously distributed throughout the area defined by a circular or oval shape of the platform. In a second wind turbine arrangement, the platform comprises a fibrous material disposed in the platform. In a third (Continued)

wind turbine arrangement, a tarpaulin edge is positioned above the platform and positioned interior to the outer pressure ring.

20 Claims, 11 Drawing Sheets

(56) References Cited

U.S. PATENT DOCUMENTS

| | | |
|---|---|---|
| 2015/0352813 A1 | 12/2015 | Galloway et al. |
| 2017/0030327 A1 | 2/2017 | Fletcher |
| 2019/0085828 A1 | 3/2019 | Jamund |
| 2019/0136836 A1 | 5/2019 | Sanderson |
| 2019/0376491 A1 | 12/2019 | Diget et al. |
| 2020/0291918 A1 | 9/2020 | Garcia De La Pena Razquin |

FOREIGN PATENT DOCUMENTS

| | | | | |
|---|---|---|---|---|
| DE | 202009002054 U1 | 6/2009 | | |
| DK | 202170410 A1 * | 8/2022 | ............. | F03D 80/50 |
| EP | 2908002 A1 | 8/2015 | | |
| EP | 3392501 A1 | 10/2018 | | |
| GB | 2543059 A * | 4/2017 | ............. | E04G 1/362 |
| RU | 2003129017 A | 3/2005 | | |
| RU | 2267690 C2 | 1/2006 | | |
| WO | 2010051817 A2 | 5/2010 | | |
| WO | WO-2015121408 A1 * | 8/2015 | ........... | F03D 1/0658 |
| WO | 2015155507 A1 | 10/2015 | | |
| WO | 2015161028 | 10/2015 | | |
| WO | 2017059865 A2 | 4/2017 | | |
| WO | 2017060708 A1 | 4/2017 | | |
| WO | 2017103308 A1 | 6/2017 | | |
| WO | 2017194940 A1 | 11/2017 | | |
| WO | 2018149528 A1 | 8/2018 | | |

OTHER PUBLICATIONS

Buitink Technology (https://www.buitink-technology.com/industry/miscellaneous-industry/inflatable-work-platform; note video was published May 18, 2019) (Year: 2019).*
Buitink Technology, "Inflatable work platform for silos", [cited Mar. 14, 2023] Available from: [www.buitink-technology.com/uk/industry/miscellaneous/inflatable-work-platform/] original file name: PU 1—Inflatable work platform for silos.pdf; Date Accessed: Mar. 9, 2023.
Youtube video: https://www.youtube.com/watch?v=YYyUNPzQJ41&1=1s; original file name: PU 1—Inflatable Workplatform for silos—YouTube .pdf; Date Accessed: Mar. 14, 2023.
PCT direct letter filed by the patentee when filing the PCT application which resulted eventually in the grant of EP3791066, dated Jun. 24, 2019. original file name: PCT direct letter.pdf.
Office Action (Mail Date Sep. 17, 2021) for U.S. Appl. No. 17/253,890, filed Dec. 18, 2020.
Office Action (Mail Date Dec. 21, 2021) for U.S. Appl. No. 17/253,890, filed Dec. 18, 2020.
Final Office Action (Mail Date Apr. 8, 2022) for U.S. Appl. No. 17/253,890, filed Dec. 18, 2020.
Advisory Action (Mail Date Jul. 18, 2022) for U.S. Appl. No. 17/253,890, filed Dec. 18, 2020.
"Trelleborg Dropstitch Dimensional Stability and Uniformity" Trelleborg Group. Date Accessed: Dec. 5, 2022. 1 page.
International Search Report and Written Opinion of the International Searching Authority issued Aug. 30, 2019 for Application No. PCT/EP2019/066741.
European Search Report and Written Opinion of the European Searching Authority issued Dec. 20, 2018 for Application No. 18179612.9.
Drop Stitch Fabric Series for Inflatable Products, https://www.durainflate.com/product-category/material/drop-stitch-fabric (downloaded Nov. 25, 2024) (8 pages).
Sun Qiang, et al. "Wind Power Engineering Technology Series Wind Farm Operation and Maintenance"; 2016.

* cited by examiner

INFLATABLE COMPONENT FOR SERVICE OR INSTALLATION OF A WIND TURBINE MODULE

CROSS-REFERENCE TO RELATED APPLICATIONS

This application is a continuation in part application claiming priority to Ser. No. 17/253,890 filed Dec. 18, 2020, the entire contents of which are hereby incorporated by reference, which claims priority to PCT Application No. PCT/EP2019/066741, having a filing date of Jun. 25, 2019, the entire contents of which are hereby incorporated by reference, which is based off of EP Application No. 18179612.9, having a filing date of Jun. 25, 2018, the entire contents of which are hereby incorporated by reference.

FIELD OF TECHNOLOGY

The following relates to the field of servicing or installation of wind turbines.

BACKGROUND

When servicing a wind turbine, but also during initial installation or erection of a wind turbine, technician will execute work at components of wind turbines. These components may be wind turbine blades or other components of the wind turbine, like the tower or the hub. The components may be positioned on the ground or on a vessel decoupled from the wind turbine or may already be part of the erected wind turbine. As a further option the components, like a blade, may be decoupled temporarily from the erected wind turbine and may hang from a crane.

During the work, harsh weather conditions like rain, wind, snow, or extreme temperatures may be experienced, for example in at an offshore installation. As a result of the harsh weather conditions the temperature may not be accurate for the repair work process.

In other regional locations, the air may comprise a lot of particles like dust. Further on, the technician may execute work that also creates particles or debris while performing the work. Uncontrolled accumulation of such particles inside the serviced component is also unwanted.

According to patent RU 2 267 690 C2 which is directed to the different field of pipeline inspection of a pipeline for transporting gas or liquid, a solid component can be positioned info a hollow pipeline. This solid component as an inflatable torus-like section at its cylindrical circumference for sealing the pipeline once inflated.

Patent application WO 2017/103308 A1 illustrates, during the production of a wind turbine blade, to use a flexible wall cover with an inflatable chamber. The goal is to compact a sheath of a wind turbine blade during manufacturing of the blade.

SUMMARY

An aspect relates to address these problems and mitigate related drawbacks.

In accordance with embodiments of the invention there is provided an inflatable component usable during service and/or installation of a wind turbine module. The inflatable component comprises an inflation structure with an air tight shell and a sealable passage in the inflation structure for ingress or discharge of air into or from the shell for inflating or deflating the inflation structure. The inflation structure is dimensioned to provide a thermal and/or physical barrier in respect of external fluids and/or physical objects or particles acting upon the inflation structure in case the inflation structure is inflated and inserted in a hollow section of the wind turbine module.

The wind turbine module may be a wind turbine blade but also other sections of a wind turbine, like a wind turbine tower, a wind turbine hub, or a wind turbine nacelle. Other examples could be a main shaft, a hub, a generator stator, a generator rotor or other wind turbine components having one or more substantially circular, oval or elliptical inner surfaces.

The inflatable component provides the advantage, for example if a wind turbine module like a blade is arranged horizontally on a jack-up vessel for service and repair, that rain, wind, or snow may be blocked to not affect the inside of the hollow blade, which may lead to the advantage that the right temperature which is needed for the repair of the blade can be maintained or configured.

Blade work outside the blade can be performed because the inflatable component is preventing undercooling from the inside.

If in another example the blade is arranged vertically hanging, for example, from a crane while being detached from the wind turbine, that dust or particles that may be created during the work, but also rain and snow, cannot enter the inside of the hollow blade beyond the inflatable component which acts as a seal and also as a collector for falling objects, dust or particles. Also lost tools that may be dropped during maintenance work inside the blade, which would cause damage of the blade, can be withheld at the inflatable component.

Overall a faster and safer environment for the work performed on the blade can be provided.

In the example of a blade as a wind turbine module, the inflatable component may keep the blade root area free and uncovered for work on the blade root and root terminals as it may be placed behind those. This is advantageous compared to a cover which could alternatively be placed over the root end of the blade. Similarly, for other wind turbine modules it may also be advantageous to be able to access one region of the module without obstruction but to have the inflatable component positioned inside the wind turbine module.

Further, during in-situ repair the wind turbine operator can be ensured that no technicians, parts, tools or dust are entering the blade or the wind turbine module.

In an embodiment the air tight shell may comprise an air tight inner shell and an outer shell surrounding the inner shell, the outer shell being of a material to protect against puncture of the inner shell. Thus a double shell structure or a bag in bag solution is provided.

The inner shell may be an inflatable structure of the inflatable component, i.e. a balloon or a bladder. The outer shell may be arranged to protect from any risk related to puncture of the inner inflatable structure.

In another exemplary embodiment the inflatable component may be sized and shaped to fit the hollow section of the wind turbine module such that, in case the inflation structure is inflated and inserted in a hollow section of the wind turbine module, a first surface structure of the inflatable component and a second surface structure of the hollow section of the wind turbine module are in fluid tight contact to limit or block a fluid leakage in between.

The inflatable component may be built substantially from a deformable material. By this it is understood that the inflatable component may be built substantially from a flexible and/or bendable and/or pliable material. It may be collapsible when deflated and will transform its form by inflation.

The inflatable component may be free of a solid frame—i.e. the inflatable component may be frameless—or free of a solid supporting structure. Thus, the inflatable component may be free of metal struts. To illustrate this design, it may have a vague similarity to a structure of a rubber boat, but little similarity to a bicycle tube, as a bicycle tube requires a solid rim to be placed on.

The inflatable component may be formed substantially in form of an elliptical cylinder, an ellipsoid or an ovoid, but not in form of a torus.

Thus, the inflatable component provides sealing. For example, to prevent wind entering the blade the inflatable component acting as a "balloon", will be blown up and fill the area and prevent wind, rain or snow to pass further into the blade, for example if the blade is arranged horizontally.

As the inflatable component being inflated it seals the inside of the wind turbine module, e.g. the blade, and it blocks, particularly if the blade is arranged vertically, loose parts, dust, etc. to proceed further down into the blade. The inserted inflatable component will result in that loose parts may lay at the side of the inflatable component so that these can be removed or collected afterwards in an easy manner.

The inflatable component may be a pre-formed component to match the inner shape of the hollow section.

In a further configuration the sealable passage may comprise a valve to control the fluid pressure inside the inflatable structure.

In another embodiment the air tight shell may be built of several air compartments. This may provide additional stability.

In a configuration with several compartments it may be provided with individual valves for each compartment and the compartments may not be fluidically connected to another. Thus puncturing of one compartment would not cause collapse of overall inflatable component.

In an additional embodiment the inflatable component may further comprise a plurality of securing members via which the inflatable component is positioned and held in place in case the inflation structure inserted in a hollow section of the wind turbine module and inflated. Hooks may be attached to the outer shell. Ropes or strings may be used to connect to the hooks and further to the wind turbine module.

Thus, hooks may be attached to the inflatable component, particularly to the outer shell, to be able to connect the inflatable component to the wind turbine module.

It is also be advantageous that the inflatable component may be a portable component in case the inflation structure is deflated.

Furthermore, the inflatable component may be configured to provide a working platform for persons in case the inflation structure is inflated, inserted in a hollow section of the wind turbine module, and arranged horizontally. The inflatable component may be the primary working platform for service personnel or just as a safety plane in case the service personnel, who is primarily connected via strings, may drop.

In consequence the inflatable component may be used during an in-situ repair of the blade root, preventing tools and dust from entering the blade when hanging downwards (vertical), and at the same time act as a wind turbine inflatable platform as safety for the technician working in the blade or other wind turbine modules.

Embodiments of the invention are also directed to a wind turbine arrangement comprising a wind turbine module, a wind turbine blade, a wind turbine tower, a wind turbine hub, a wind turbine nacelle, and an inflatable component as explained before. In such an arrangement the inflatable component is positioned and inflated inside a hollow section of the wind turbine module for service and/or installation of a wind turbine module.

Further on, embodiments of the invention are also directed to a servicing or installation method of a wind turbine module. The method comprises the following steps: (a) inserting an inflatable component into a hollow section of a wind turbine module, the inflatable component comprising an inflation structure with an air tight shell and a sealable passage in the inflation structure for ingress or discharge of air into or from the shell for inflating or deflating the inflation structure; and (b) inflating the inflatable structure such that it forms a thermal and/or physical barrier in respect of external fluids and/or physical objects or particles acting upon the inflation structure.

For work on a wind turbine module like a blade for which work is to be performed in horizontal orientation of the module, the method may also comprise these initial steps: decoupling the wind turbine module from a wind turbine installation; and orienting the wind turbine module in horizontal orientation. The step of inserting the inflatable component may then be performed while orienting the inflatable component vertically inside the hollow section, such that the inflatable component may provide the barrier for a horizontal movement of the external fluid or of the external physical objects or particles.

In case of service or installation work of a vertically arranged module, the additional method steps are similar: first decoupling the wind turbine module from a wind turbine installation; and orienting the wind turbine module in vertical orientation. The step of inserting the inflatable component may then be performed while orienting the inflatable component horizontally inside the hollow section, such that the inflatable component may provide the barrier for a vertical movement of the external fluid or of the external physical objects or particles.

To secure the inflatable component, the inflatable component may be connected by strings and/or wires to the wind turbine module. The inflatable component may stay connected throughout the servicing or installation work.

As a further option, particularly in case of harsh temperature conditions, the work may be performed while applying heat inside wind turbine module.

Furthermore, examples have been and will be disclosed in the following sections by reference to wind turbine blades. Embodiments of the invention are also applicable for any type of wind turbine module, e.g. tower or hub. Furthermore, the general concept can be applied to rotating parts as well as stationary parts when the wind turbine is operating after the servicing or installation work has ended.

In another embodiment, the wind turbine arrangement includes an inflatable component disposed within a hollow section of a wind turbine blade, wherein the inflatable component is a platform usable during service and/or installation of a wind turbine module, wherein the inflatable component includes an inflation structure with an air tight shell, wherein the air tight shell includes an inner shell and an outer shell surrounding the inner shell, and wherein the outer shell includes a material that protects against puncture of the inner shell. In one aspect of this embodiment, the inner shell includes of one or more compartments, wherein each compartment comprises a sealable passage, and wherein each compartment is configured to be inflated with a gaseous fluid via the sealable passage and to be deflated via the sealable passage.

In another embodiment, the wind turbine arrangement includes a wind turbine blade; an inflatable platform positioned in the wind turbine blade; and an inflatable outer pressure ring that surrounds the platform, wherein the outer pressure ring, when inflated, fixes the platform in the wind turbine blade by generating a normal friction force between the platform and the wind turbine blade.

The aspects defined above and further aspects of embodiments of the present invention are apparent from the examples of embodiment to be described hereinafter and are explained with reference to the examples of embodiment.

BRIEF DESCRIPTION OF THE DRAWINGS

Some of the embodiments will be described in detail, with reference to the following figures, wherein like designations denote like members, wherein.

The illustration in the drawing is schematical. It is noted that for similar or identical elements in different figures, the same reference signs will be used.

DETAILED DESCRIPTION

In horizontal position for blade work a tent and heaters are often used to controlling the outside temperature of the blade surface or other components where used, but the tent does not cover the complete blade and the wind can enter in the root end and cool down the blade from the inside avoiding correct temperature for repair work. This can be improved by using an inflatable component which can be inserted into the hollow section of the blade.

Figure 1:
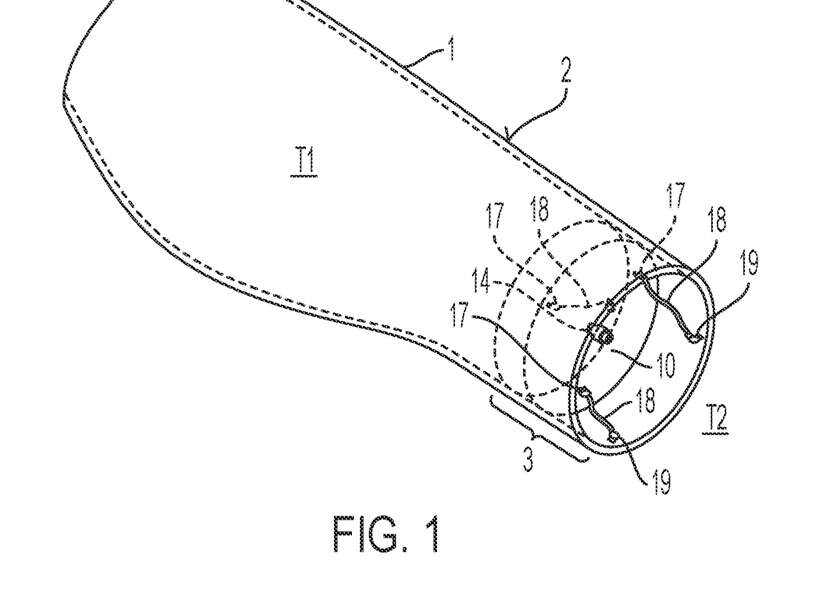
FIG. 1 shows schematically a blade of a wind turbine in which an inventive inflatable component is placed.

Referring now to FIG. 1 (with additional reference to FIG. 2), a blade 1 is shown as a wind turbine module which is detached from the wind turbine for service. The blade 1 is a hollow component with the blade wall 2. At a root end of the blade 1 a hollow root section 3 is located.

Figure 2:
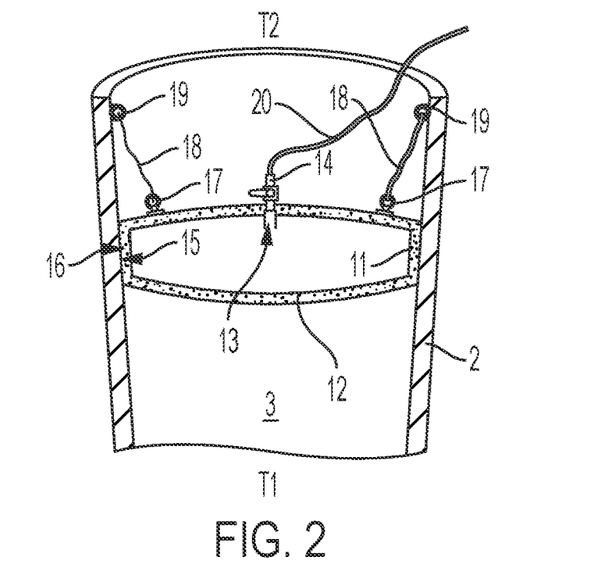
FIG. 2 illustrates in a cross sectional view an inserted inflatable component in a hollow wind turbine module

During service, as shown in FIGS. 1 and 2, an inflatable component 10 may be inserted into the hollow root section 3 of blade 1. The inflatable component 10 comprises further an inflation structure 11 with an air tight shell 12, which is illustrated in FIG. 2. The inflation structure 11 can be inflated with air or another gaseous fluid and later also deflated via a sealable passage 13. A valve 14 may be positioned in or may be part of the sealable passage 13 so that the inflation structure 11 can be inflated or deflated in a controlled manner. The valve 14 may be located at the centre of the inflatable component 10 or at any other position at a top surface of the inflatable component 10.

The valve 14 may be operated manually, e.g. by the help of an attached string or wire 20 or similar means attached to an open/close handle of the valve 14.

The inflation structure 11 is dimensioned to provide a thermal and/or physical barrier in respect of external fluids and/or physical objects or particles acting upon the inflation structure 11 in case the inflation structure 11 is inflated and inserted in a hollow section 3 of the wind turbine module 1. Thus, a temperature T1 inside the blade 1 may be different to a temperature T2 outside of the blade 1.

As particularly highlighted in FIG. 2, but also shown in FIG. 1, the inflatable component 10 is sized and shaped to fit the hollow section 3 of the blade 1 such that, in case the inflation structure 11 is inflated and inserted in the hollow root section 3 of the wind turbine module 1, a first surface structure 15 of the inflatable component 10 and a second surface structure 16 of the hollow section 3 of the wind turbine module 1 are in fluid tight contact to limit or block a fluid leakage in between. By this the inflatable component 10 acts as a temperature barrier. Furthermore, this provides stability of the inflatable component 10. Wind, air, snow, or dust is also properly blocked from entering the hollow inside of the blade 1.

Further it is shown that the inflatable component 10 comprises a plurality of securing members 17 via which the inflatable component 10 is positioned and held in place in case the inflation structure 11 is inflated and inserted in a hollow root section 3 of the blade 1. The securing members 17 may be straps to which cables, ropes, or wires 18 can be connected. The other ends of these cables, ropes, or wires 18 may be fasted to hooks 19 and connected to the blade 1 or another solid structure, like a vessel on which the blade 1 is positioned.

By this fastening it can be guaranteed that the inflatable component 10 remains in position, even if the blade 1 is positioned vertically.

Figure 3:
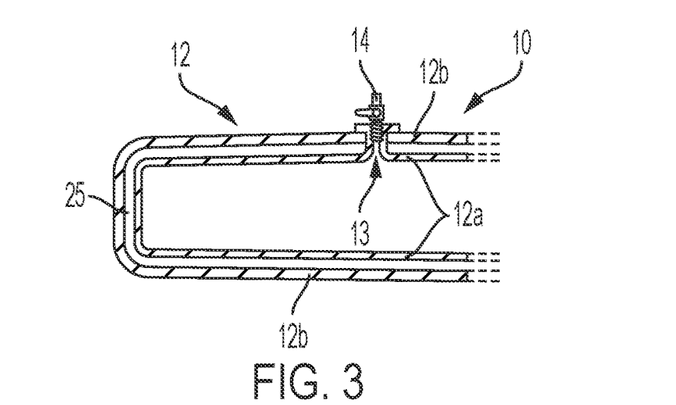
FIG. 3 illustrates in a cross sectional view a double shell structure of the inflatable component.

As a variant of FIG. 2, FIG. 3 illustrates a double shell structure of the inflatable component 10. The air tight shell 12 comprises an air tight inner shell 12a and an outer shell 12b surrounding the inner shell 12a, the outer shell 12b being of a material to protect against puncture of the inner shell 12a. The double shell structure provides additional protection in respect of puncturing the air filled compartment. The inner shell 12a of the inflatable component 10 can be inflated with air or another gaseous fluid and later also deflated via a sealable passage 13. A valve 14 may be positioned in or may be part of the passage 13 so that the inner shell 12a can be inflated or deflated in a controlled manner. The valve 14 may be located at the centre of the inflatable component 10 or at any other position at a top surface of the inflatable component 10. A gap 25 is disposed between the inner shell 12a and the outer shell 12b. The passage 13 is bounded by a boundary comprising surface area of both the inner shell 12a and the outer shell 12b. The inner shell 12a and the outer shell 12b are mechanically joined at both a first portion and a second portion of the boundary of the passage 13.

Figure 4:
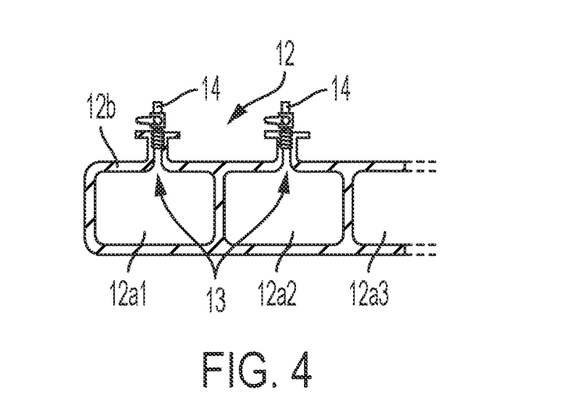
FIG. 4 illustrates in a cross sectional view a multi compartment structure of the inflatable component.

FIG. 4 illustrates in a cross sectional view a multi compartment structure of the inflatable component 10. The air tight shell 12 is built of several air compartments as illustrated via air tight inner shells 12a1, 12a2, 12a3 (not shown in FIG. 4 but shown in FIG. 7), each having individually a sealable passage 13 and a valve 14. All air tight inner shells are surrounded by a joint outer shell 12b.

Figure 5:
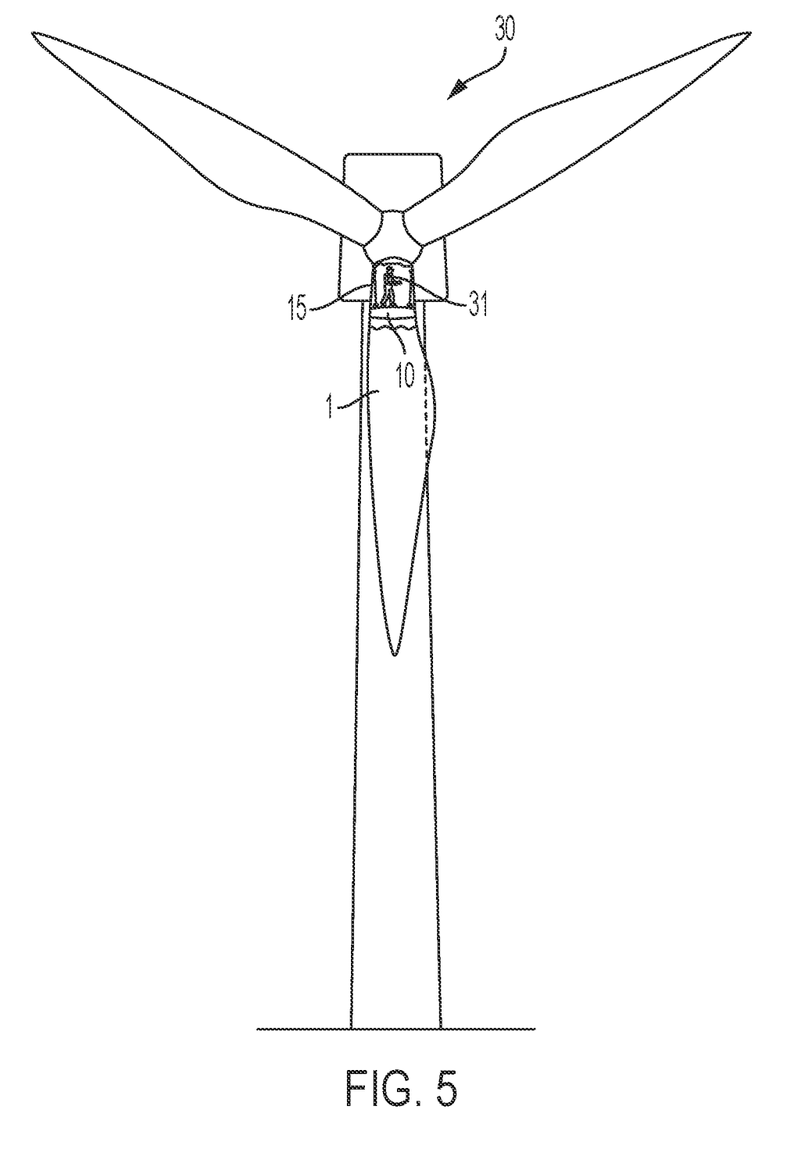
FIG. 5 shows schematically a three bladed wind turbine in which an inflatable component is inserted.

FIG. 5 shows schematically a three bladed wind turbine 30 in which an inflatable component 10 is inserted for service work. The solution may also work for wind turbines with a different number of blades.

In the illustration one blade 1 is placed in a substantially vertical position where the service technician 31 may work inside the blade 1. The inflatable component 10 has been inserted, secured via cables, ropes, or wires 18, and inflated. The service technician 31 may use the inflatable component 10 as a working platform or the inflatable component 10 may only be placed inside the blade 1 below the service technician preventing dust and tools from entering the blade 1 below the service technician 31.

FIG. 5 shows an example in which the blade 1 as to be serviced wind turbine module remains connected and installed. Alternatively, the blade 1 could be detached and hanging vertically from a crane or similar solution.

Figure 6:
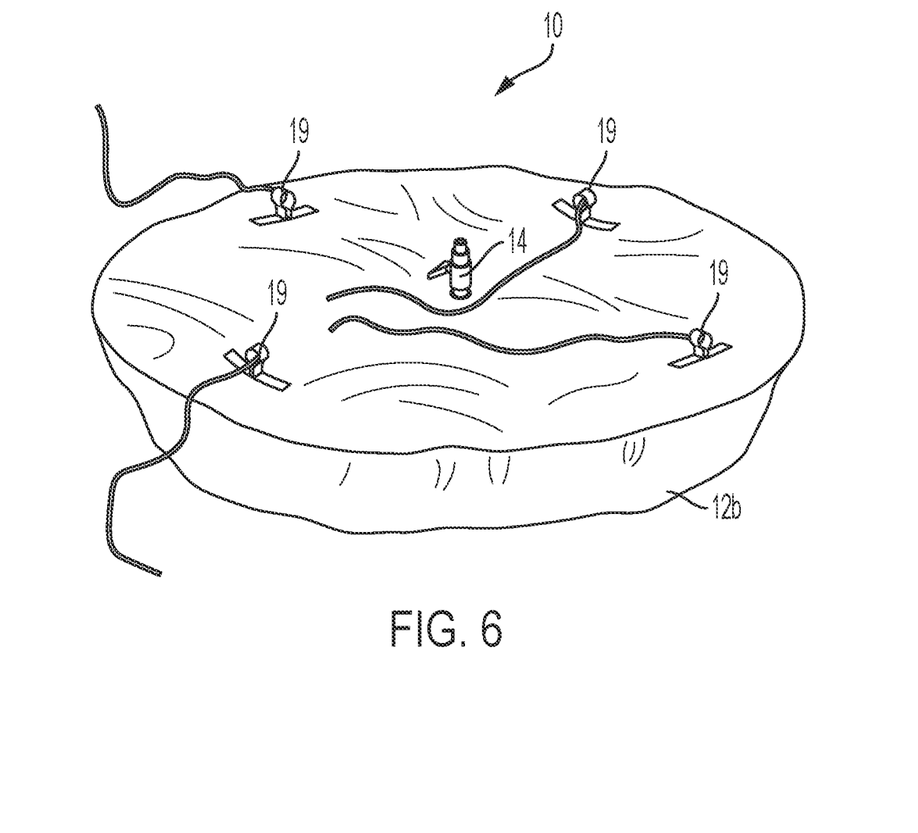
FIG. 6 shows schematically a semi inflated inflatable component.

FIG. 6 shows schematically a semi inflated inflatable component 10 which is not yet installed in the wind turbine module or in the blade 1. The valve 14 can be seen and the outer shell 12b. Also hooks 19 are indicated which may be built from a soft fabric.

The valve 14 may arranged to have a hose installed. Additionally or alternatively, the valve 14 may be designed as pressure valve to secure pressure.

The discussed solution according to the figures tackles the following technical issues, which are explained for blades but apply also to other wind turbine modules in a similar fashion:

During blade repair work performed on a jack-up vessel onto which blades may be arranged horizontally or any work with the blade in horizontal position, there is the need to control the temperature inside the blade to be able to perform the work in controlled environment. Potential risk from wind, water, snow, etc. could cause problem to the repair, service, or installation process. This is solved via the inflatable component, as this element will be blown up and by this it will fill the open area inside the blade. Thus it prevents wind, rain, etc. to pass further into the blade. A heating solution can optionally be installed inside to add speed to the process of getting right temperature to repair blade.

Another component of a wind turbine with substantially a horizontal orientation would be the nacelle or the hub, into which the inflatable component could be inserted in the same way.

The discussed solution prevents further any parts from dropping into the blade during a process for work when the blade being oriented vertically. It prevents any loose parts as well as dust created during previous operation of the wind turbine to enter the blade, which would otherwise create the potential risk of stopping drain hole or being stuck in the blade creating damages when the wind turbine generator is being restarted. This is solved as the inflatable component, when being inflated, seals off around the inside of the blade. It protects that any parts or dusts, etc. could proceed further down into the blade. This is possible as these parts will lay at the side of the inflatable component so that these can be removed or collected easily.

Horizontal operation as just explained may also be applied for work inside the tower.

The inflatable component additionally operates as a safety device for the technicians when working inside the blade when in vertical position. When being attached to secured points the inflatable component can work as a floor for the technicians to step on or just as a back-up when hanging in a rope system.

Without explicit illustration further advantages and configurations will be explained in the following.

The inflatable component consists of an inflatable system being able to reliably stop wind and heavy rain inside a blade being worked on at ground level, and/or a solution to stop anything from being inserted by fall or drop into the blade during vertical work on the blade, this being both related to tools and manpower as the inflatable component in this solution being attached to approved point in hub and/or nacelle and being able to hold the load of any components etc. with the load from 0 to 136 kg or more, e.g. 200 kg or 500 kg or more, depending on the inflatable platform material, thickness and the inflatable air pressure as well as anchor points etc. The inflatable component acting as a stopper can be used as a floor in combination with rope systems which are used by the technicians as the primary solution to be secured.

Time for inflating the inflation structure may be less than 10 minutes depending on equipment available, so cost and timewise it would be able to include the use of the inflatable component in existing working process.

Wind Turbine Arrangement with Double Shell Structure

The double shell structure 12, which was previously discussed in conjunction with FIGS. 3 and 4, will be presented next in more detail and in a context of an embodiment of a wind turbine arrangement with the double shell structure.

The air tight shell 12 in FIG. 3 includes a double shell structure including an inner shell 12a, an outer shell 12b, and a gap 25 disposed between the inner shell 12a and the outer shell 12b.

In one embodiment, the outer shell 12b includes polyvinyl chloride (PVC), thermoplastic polyurethane (TPU), rubber, or combinations thereof.

In one embodiment, the inner shell 12a includes polyvinyl chloride (PVC), thermoplastic polyurethane (TPU), or combinations thereof.

In FIG. 4, the air tight shell 12 is multi-compartment double shell structure having N inner shells 12a1, 12a2, 12a1, wherein N is at least 2. Each inner shell 12a1, 12a2, 12a3 is a compartment of the entire inner shell 12a. In FIG. 4, the entire inner shell 12a includes the N inner shells 12a1, 12a2, 12a3.

The embodiments of FIGS. 3 and 4 may be combined as follows. The inner shell 12a of the air tight shell 12 includes one or more compartments (i.e., N compartment wherein N is at least 1). FIG. 4 represents an embodiment in which the inner shell 12a consists of more than one compartment 12a1, 12a2, 12a3 (i.e., N is at least 2). FIG. 3 represents an embodiment in which the inner shell 12a consists of one compartment (i.e., N=1).

Each compartment includes a sealable passage 13. Each compartment is configured to be inflated with a gaseous fluid (e.g., air) via the sealable passage 13 and to be deflated via the sealable passage 13.

The sealable passage 13 in each compartment is bounded by a boundary including surface area of both the inner shell in each compartment (12a1, 12a2, 12a3) and the outer shell 12b.

The inner shell in each compartment (12a1, 12a2, 12a3) and the outer shell 12b are mechanically joined at both a first portion and a second portion of the boundary that bounds the sealable passage in each compartment.

The sealable passage 13 in each compartment (12a1, 12a2, 12a3) includes a valve 14 therein. The valve 14 enables the inner shell in each compartment (12a1, 12a2, 12a3) to be inflated or deflated in a controlled manner.

Figure 7:
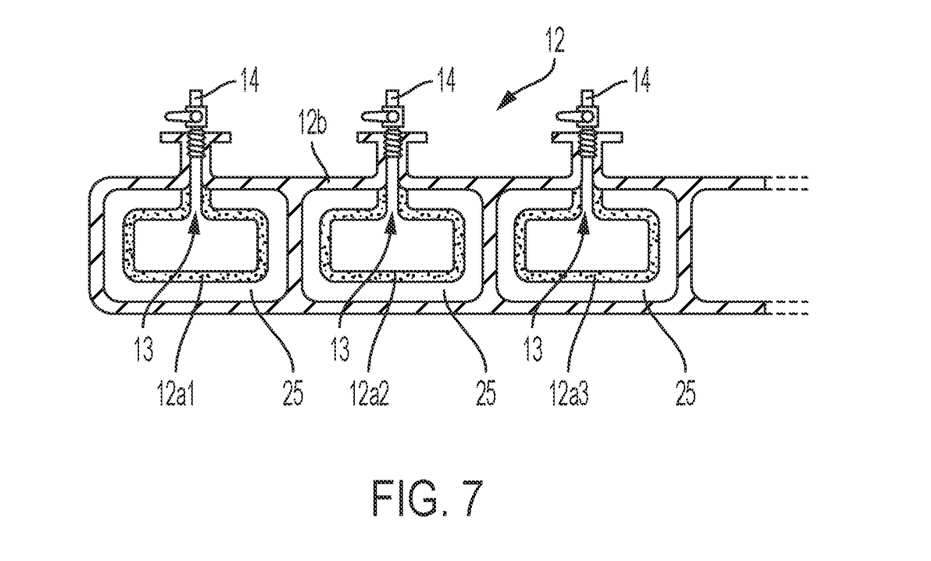
FIG. 7 depicts the multi-compartment double shell structure of FIG. 4 with an addition of surrounding walls of the inner shells, which are not explicitly shown in FIG. 4.

FIG. 7 depicts the multi-compartment double shell structure of FIG. 4 with an addition of surrounding walls of inner shells 12a1, 12a2, and 12a3 which are not explicitly shown in FIG. 4. The inner shell in each compartment (12a1, 12a2, 12a3) and the outer shell 12b are separated by a gap 25.

Wind Turbine Arrangement with Outer Pressure Ring

An embodiment of a wind turbine arrangement with an outer pressure ring is presented next.

Figure 8:
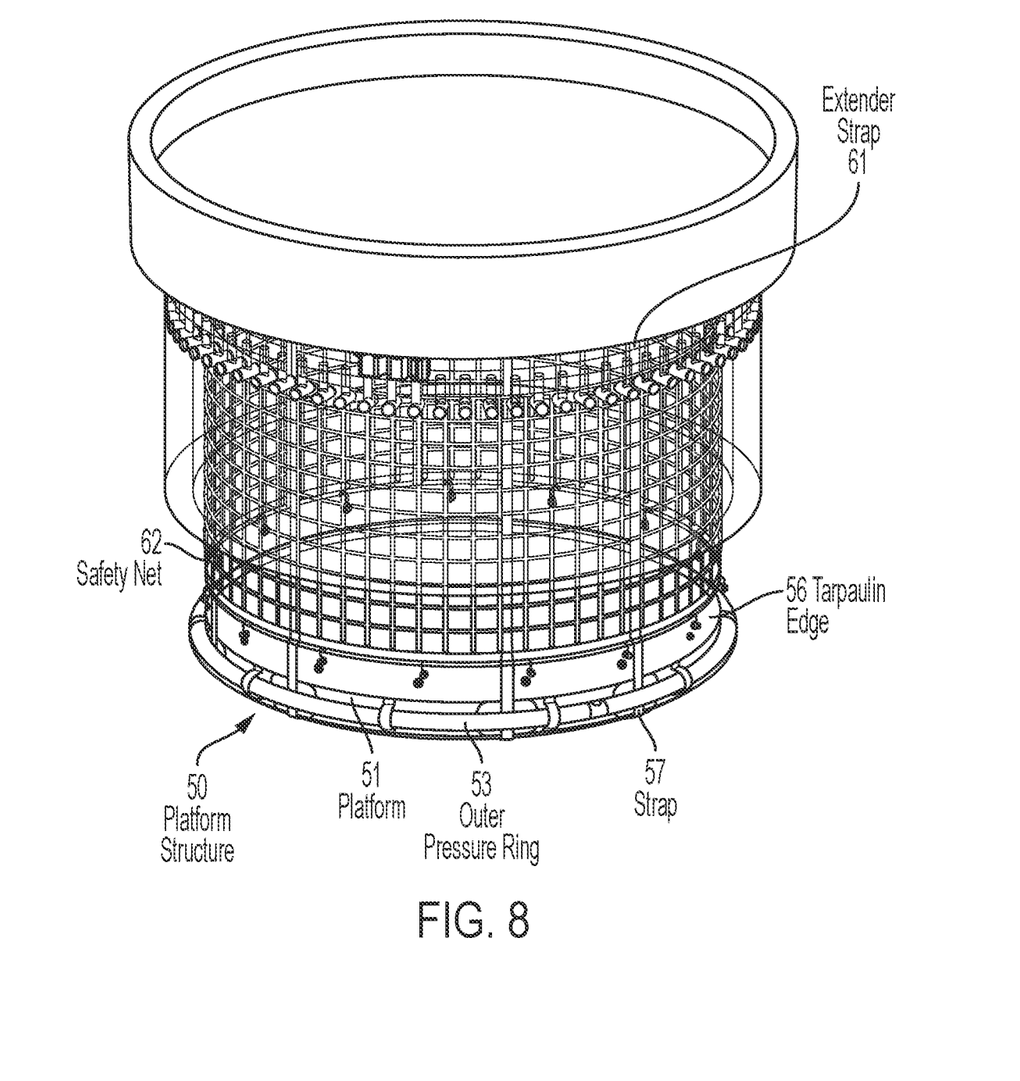
FIG. 8 depicts a platform structure of a wind turbine arrangement, the platform structure including an inflatable platform and an inflatable outer pressure ring surrounding the platform, as well as a safety net and a plurality of strap configurations for supporting the safety net.

FIG. 8 depicts a platform structure 50 of a wind turbine arrangement. The platform structure 50 includes an inflatable platform 51 and an inflatable outer pressure ring 53 surrounding the platform 51, as well as a safety net 62 and multiple strap configurations for supporting the safety net 62. Each strap configuration includes a strap 57 and an extender strap 61 connected together.

The platform structure 50, including the platform 51, is positioned in the wind turbine blade 1 such that the outer pressure ring 53 is in mechanical contact with the blade wall 2 in a manner shown in FIG. 1 which depicts the inflatable component (i.e., platform) 10 in mechanical contact with the blade wall 2.

The outer pressure ring 53, when inflated, fixes the platform 51 in the wind turbine blade 1 by generating a normal friction force between the platform 51 and the wind turbine blade 1 (e.g., between the platform 51 and inner surveys of the wind turbine blade 1).

Also shown in FIG. 8 is a tarpaulin edge 56 positioned above the platform 51 and positioned interior to the outer pressure ring 53. The multiple strap configurations connect the tarpaulin edge 56 to the safely net 62 that is positioned above the tarpaulin edge 56.

Figure 9:
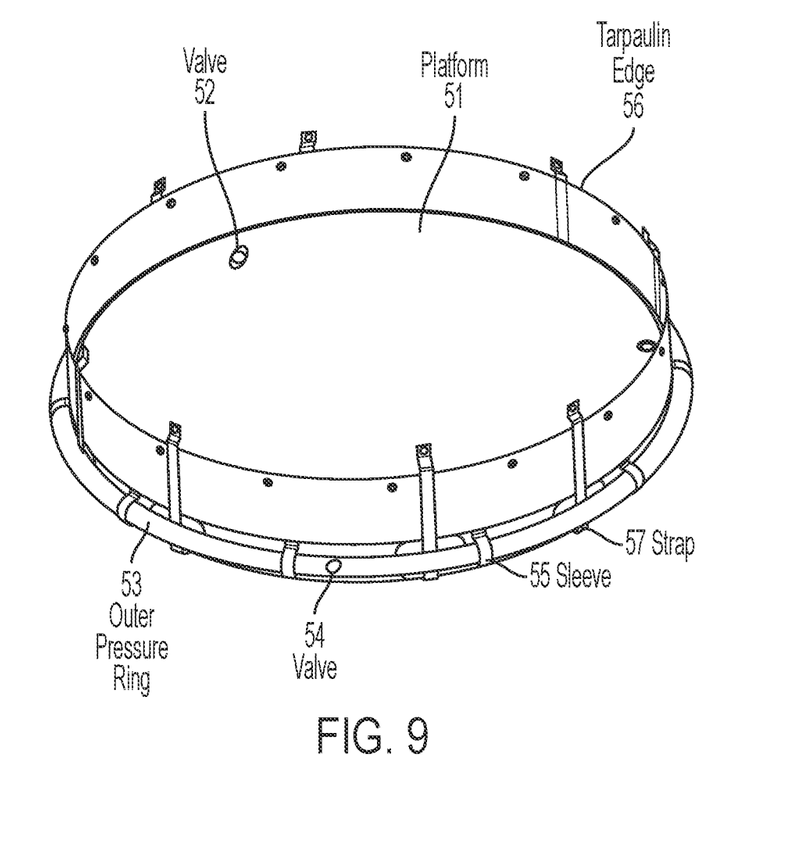
FIG. 9 depicts the platform and outer pressure ring in FIG. 8 in more detail.

FIG. 9 depicts the platform 51 and outer pressure ring 53 in FIG. 8 in more detail.

The platform 51 includes a valve 52 used for inflating the platform 51 with a gaseous fluid such as, inter alia, air or an inert gas (e.g., carbon dioxide, nitrogen, etc.). The valve 52 enables the platform 51 to be inflated or deflated in a controlled manner. Although one valve 52 in the platform 51 is depicted in FIG. 9, the platform 51 may include two or more valves, which would enable another valve in the platform 51 to be used in response to a discovery that valve 52 is defectively closed and cannot be opened.

The platform 51 includes an anti-slip layer on which an individual may stand or walk.

The outer pressure ring 53 includes a valve 54 used for inflating the outer pressure ring 53 with a gaseous fluid such as, inter alia, air or an inert gas (e.g., carbon dioxide, nitrogen, etc.). The valve 54 enables the outer pressure ring 53 to be inflated or deflated in a controlled manner. Although one valve 54 in the outer pressure ring 53 is depicted in FIG. 9, the outer pressure ring 53 may include two or more valves, which would enable another valve in the outer pressure ring 53 to be used in response to a discovery that valve 54 is defectively closed and cannot be opened.

Figure 10:
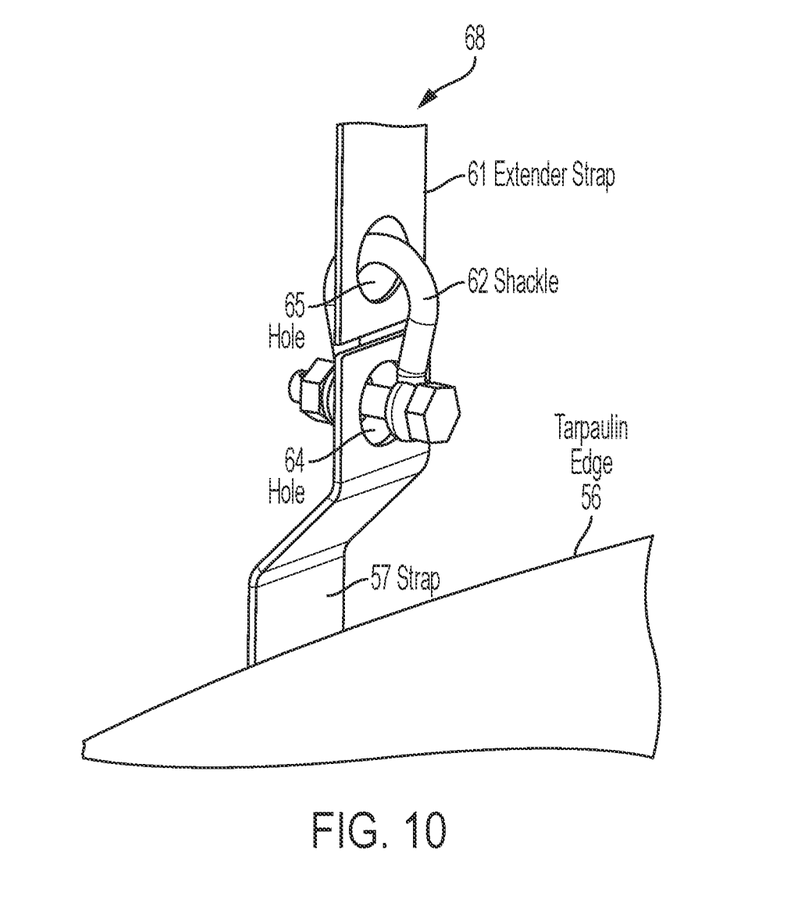
FIG. 10 depicts the strap configuration of FIG. 8 in more detail.

FIG. 10 depicts the strap configuration in FIG. 8 in more detail.

Each strap configuration 68 includes a strap 57 having a first hole 64 therein and an extender strap 61 having a second hole 65 therein. The strap 57 and extender strap 61 are connected to each other by a shackle 62 that passes through the first hole 64 and the second hole 65.

Figure 11:
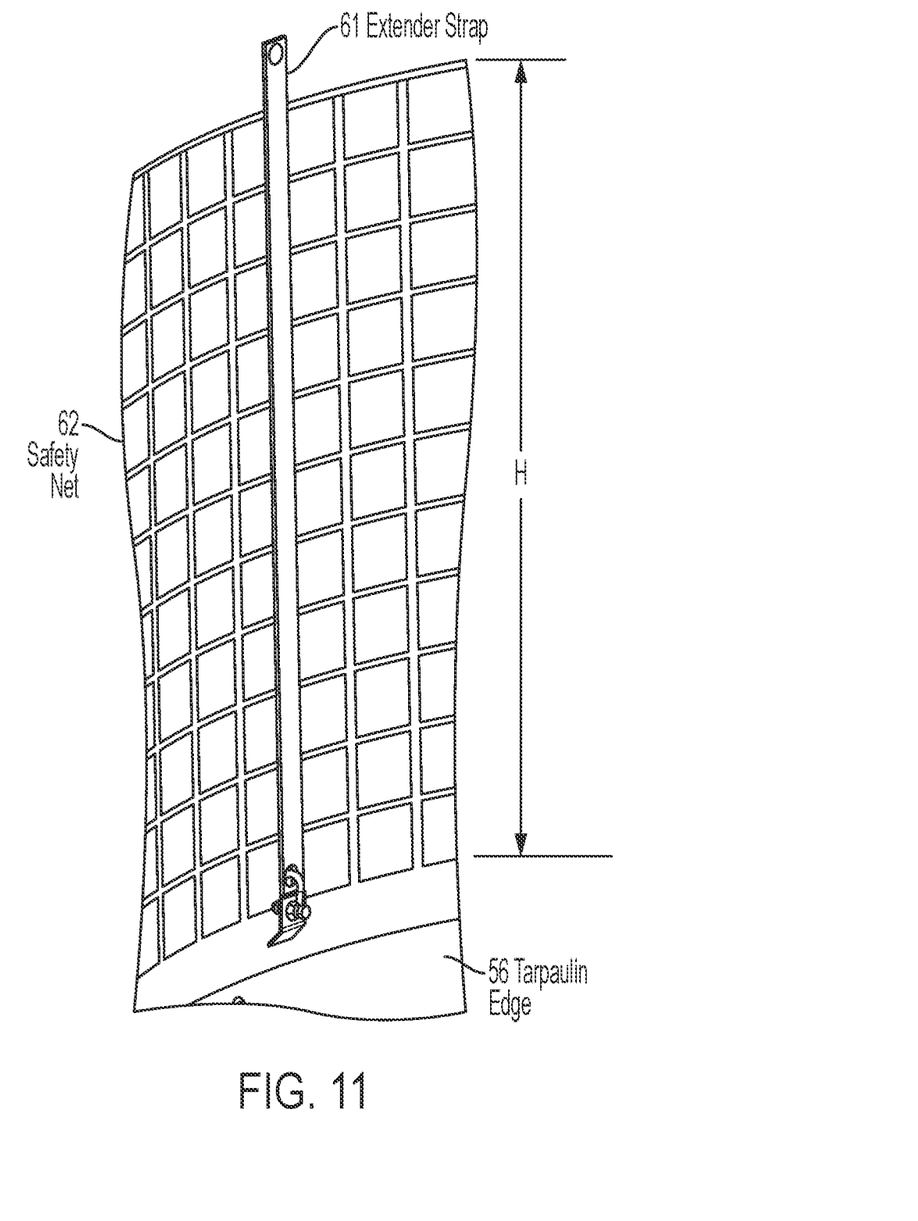
FIG. 11 depicts the safety net in FIG. 8 in more detail.

FIG. 11 depicts a partial view of the safety net 62 in FIG. 8.

The safety net 62 has a height H above the tarpaulin edge 56.

It is noted that the inflated platform 51 may have, inter alia, a circular shape or an oval shape.

In one embodiment, if the inflated platform 51 has a circular shape or an oval shape and the height H of the safety net is a first height H1 or a second height H2, respectively, then the first height H1 is greater than the second height H2.

Figure 12:
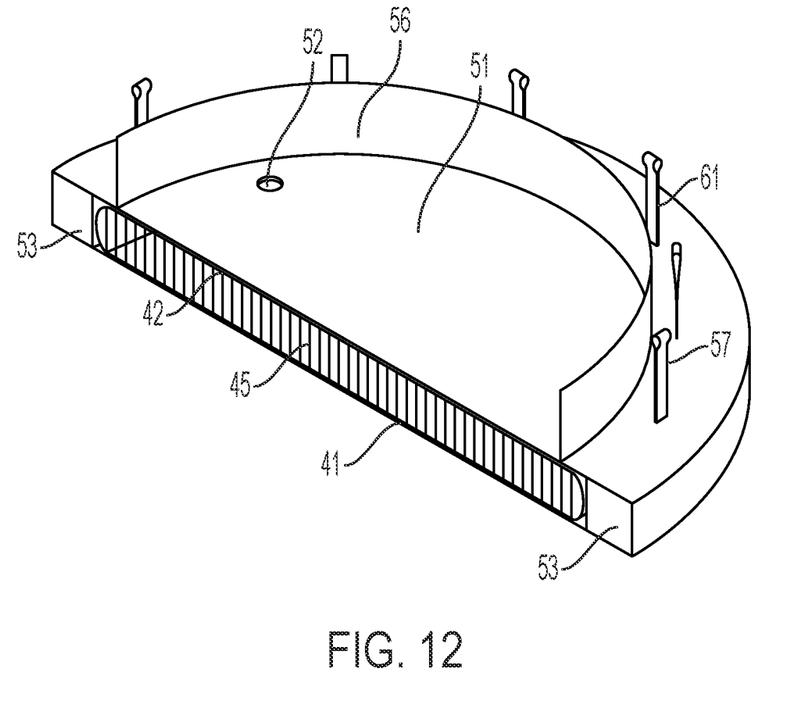
FIG. 12 depicts a three-dimensional sectional view of the platform and outer pressure ring depicted in FIG. 8, showing a fibrous material disposed in the platform.

FIG. 12 depicts a three-dimensional sectional view of platform 51 and outer pressure ring 53 depicted in FIG. 8, showing a fibrous material 45 disposed in platform 51.

The fibrous material 45 includes fibers extending through the thickness of platform 51 from a lowest layer 41 of platform 51 to a highest layer 42 of platform 51. The thickness of platform 51 is defined as the distance between the lowest layer 41 and the highest layer 42. The thickness direction of the platform is defined as a direction that is perpendicular to the lowest layer 41.

FIG. 12 also depicts the valve 52 in the platform 51, the outer pressure ring 53 surrounding platform 51, tarpaulin edge 56, straps 57, and extender straps 61.

The fibrous material 45 includes fibers which, upon being fully extended in the thickness direction of the platform, have a fixed length and are not flexible.

In one embodiment, the fibrous material 45 is double wall fabric (DWF), which may be fabricated by simultaneously weaving the fibers together to join the lowest layer 41 and highest layer 42 of platform 51, which creates a structurally strong platform.

In one embodiment, the fibrous material 45 comprises polyester, nylon, Kevlar® (hereinafter "kevlar"), or combinations thereof).

With the platform 51 being inflated with a gaseous fluid using valve 52 to inflate the platform 51, the fibrous material 45 within the platform 51 facilitates a structurally stiff platform such that the load bearing capacity of the platform 51 increases as the thickness of the platform, which includes the fibrous material 45, increases. Thus, a minimum thickness of the platform 51, while the platform 51 is inflated, is required to satisfy a specified minimum load bearing capacity requirement for the platform 51. In one embodiment, the minimum thickness of the platform 51, when inflated, is in a range of 20 to 30 cm.

Figure 13:
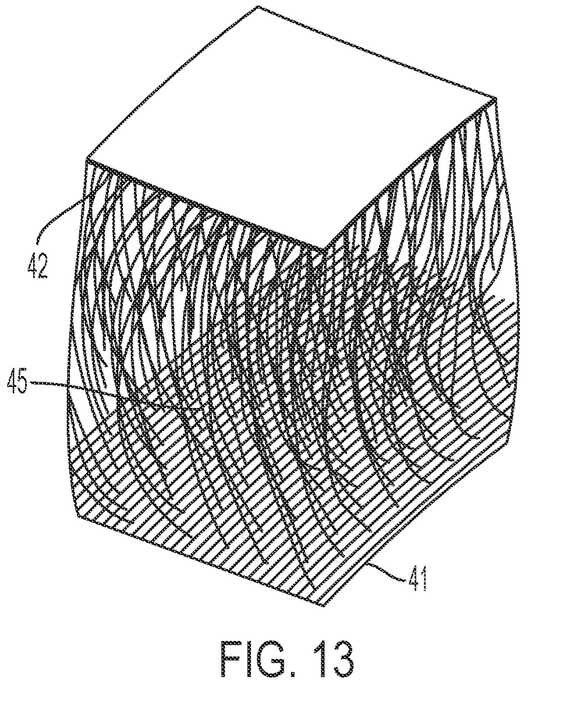
FIG. 13 depicts the fibrous material of FIG. 12 in more detail.

FIG. 13 depicts the fibrous material 45, comprising double wall fabric, of FIG. 12 in more detail.

The double wall fabric in FIG. 13 includes a first layer of fabric 41 as the lowest layer of platform 51, a second layer of fabric 42 as the highest layer of platform 51, and stiches of yarn 45 between the first layer of fabric 41 and the second layer of fabric 42. The stiches of yarn 45, which are the fibers of the fibrous material 45, lock the first layer of fabric 41 and the second layer of fabric 42 together.

In one embodiment, the stiches of yarn are woven together.

In one embodiment, the stiches of yarn are evenly spaced between the first layer of fabric 41 and the second layer of fabric 42.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed is:

1. A wind turbine arrangement, comprising:
a wind turbine blade;
an inflatable platform positioned in the wind turbine blade, wherein after the platform has been inflated with a gaseous fluid, the platform has a circular shape or an oval shape having an area defined by a radius of the circular shape or by major and minor radii of the oval shape, respectively, and wherein the inflated platform comprises a material that contains the gaseous fluid and is continuously distributed throughout the area; and
an inflatable outer pressure ring that surrounds the platform, wherein the outer pressure ring, when inflated with a gaseous fluid, fixes the platform in the wind turbine blade by generating a normal friction force between the platform and the wind turbine blade.

2. The wind turbine arrangement of claim 1, wherein the outer pressure ring comprises a valve, and wherein the valve in the outer pressure ring enables the outer pressure ring to be inflated or deflated in a controlled manner.

3. The wind turbine arrangement of claim 1, wherein the platform comprises a valve, and wherein the valve in the platform enables the platform to be inflated or deflated in a controlled manner.

4. The wind turbine arrangement of claim 1, wherein the outer pressure ring comprises polyvinyl chloride (PVC), thermoplastic polyurethane (TPU), or rubber.

5. A wind turbine arrangement, comprising:
a wind turbine blade;
an inflatable platform positioned in the wind turbine blade, wherein the platform comprises a fibrous material disposed in the platform, said fibrous material being fibers extending through a thickness of the platform from a lowest layer of the platform to a highest layer of the platform; and
an inflatable outer pressure ring that surrounds the platform, wherein the outer pressure ring, when inflated with a gaseous fluid, fixes the platform in the wind turbine blade by generating a normal friction force between the platform and the wind turbine blade.

6. The wind turbine arrangement of claim 5, wherein the thickness of the platform, while the platform is inflated with the gaseous fluid and with the fibrous material being disposed in the platform, is at least a minimum thickness required to satisfy a specified minimum load bearing capacity requirement for the platform.

7. The wind turbine arrangement of claim 5, wherein the fibers, upon being fully extended in a thickness direction of the platform, have a fixed length and are not flexible.

8. The wind turbine arrangement of claim 5, wherein the fibrous material comprises a double wall fabric that includes a first layer of fabric as the lowest layer of the platform, a second layer of fabric as the highest layer of the platform, and stiches of yarn as the fibers between the first layer of fabric and the second layer of fabric.

9. The wind turbine arrangement of claim 8, wherein the stiches of yarn are woven together.

10. The wind turbine arrangement of claim 8, wherein the stiches of yarn are evenly spaced between the first layer of fabric and the second layer of fabric.

11. The wind turbine arrangement of claim 5, wherein the fibers comprise polyester, nylon, kevlar, or combinations thereof.

12. The wind turbine arrangement of claim 5, wherein the outer pressure ring comprises a valve, and wherein the valve in the outer pressure ring enables the outer pressure ring to be inflated or deflated in a controlled manner.

13. The wind turbine arrangement of claim 5, wherein the platform comprises a valve, and wherein the valve in the platform enables the platform to be inflated or deflated in a controlled manner.

14. The wind turbine arrangement of claim 5, wherein the outer pressure ring comprises polyvinyl chloride (PVC), thermoplastic polyurethane (TPU), or rubber.

15. A wind turbine arrangement, comprising:
a wind turbine blade;
an inflatable platform positioned in the wind turbine blade;
an inflatable outer pressure ring that surrounds the platform, wherein the outer pressure ring, when inflated with a gaseous fluid, fixes the platform in the wind turbine blade by generating a normal friction force between the platform and the wind turbine blade; and
a tarpaulin edge positioned above the platform and positioned interior to the outer pressure ring, wherein a plurality of strap configurations connect the tarpaulin edge to a safety net that is positioned above the tarpaulin edge.

16. The wind turbine arrangement of claim 15, wherein each strap configuration comprises a lower strap having a first hole therein and a strap extender having a second hole therein, and wherein the lower strap and the strap extended extender are connected to each other by a shackle that passes through the first hole and the second hole.

17. The wind turbine arrangement of claim 15, wherein a combination of a shape of the platform and a height of the safety net above the tarpaulin edge is selected from the group consisting of a first combination of a circular shape of the platform and a first height of the safety net and a second combination of an oval shape of the platform and a second height of the safety net, and wherein the first height is greater than the second height.

18. The wind turbine arrangement of claim 15, wherein the outer pressure ring comprises a valve, and wherein the valve in the outer pressure ring enables the outer pressure ring to be inflated or deflated in a controlled manner.

19. The wind turbine arrangement of claim 15, wherein the platform comprises a valve, and wherein the valve in the platform enables the platform to be inflated or deflated in a controlled manner.

20. The wind turbine arrangement of claim 15, wherein the outer pressure ring comprises polyvinyl chloride (PVC), thermoplastic polyurethane (TPU), or rubber.

* * * * *